United States Patent [19]
David

[11] Patent Number: 5,651,535
[45] Date of Patent: Jul. 29, 1997

[54] MOUNTING ASSEMBLY WITH DISSIMILAR RADIAL SPRING RATES

[76] Inventor: Thomas A. David, 7763 Linda Ave., Fairview, Pa. 16415

[21] Appl. No.: 179,469

[22] Filed: Jan. 7, 1994

[51] Int. Cl.⁶ ........................................... F16M 5/00
[52] U.S. Cl. ........................... 267/140.5; 267/153
[58] Field of Search ........................ 267/219, 220, 267/292, 293, 153, 140.5, 140.2; 248/562, 636, 615; 180/300

[56] References Cited

U.S. PATENT DOCUMENTS

| | | | |
|---|---|---|---|
| 2,382,372 | 8/1945 | Wallerstein | 248/358 |
| 2,538,955 | 1/1951 | Efromson et al. | 248/10 |
| 2,665,864 | 1/1954 | Mooney | 248/10 |
| 2,781,990 | 2/1957 | Via | 267/293 |
| 2,948,502 | 8/1960 | Hutton | 248/358 |
| 3,128,999 | 4/1964 | Schmitt | 267/1 |
| 3,304,043 | 2/1967 | Beck | 248/358 |
| 3,675,881 | 7/1972 | Caldwell | 248/9 |
| 3,895,408 | 7/1975 | Leingang | 16/2 |
| 3,949,975 | 4/1976 | Miers | 267/136 |
| 4,391,436 | 7/1983 | Fishbaugh | 267/140.1 |
| 4,416,446 | 11/1983 | Murakami | 267/140.3 |
| 4,854,562 | 8/1989 | de Fontenay | 267/292 |
| 4,859,148 | 8/1989 | Hibyan | 416/134 A |
| 4,919,401 | 4/1990 | Yano | 267/140.1 |
| 5,024,425 | 6/1991 | Schwerdt | 267/293 |
| 5,033,722 | 7/1991 | Lammers | 267/153 |
| 5,116,030 | 5/1992 | Nowak et al. | 267/140.4 |

FOREIGN PATENT DOCUMENTS

| | | | |
|---|---|---|---|
| 733005 | 4/1966 | Canada | 267/293 |
| 2404768 | 8/1975 | Germany | 267/293 |
| 2146328 | 6/1990 | Japan | 267/140.2 |

OTHER PUBLICATIONS

Lord Brochure DS-7001e, Center Bonded Mounts, 1986.
Lord Brochure DS-7020c, Two-Piece Center Bonded Mount, 1991.

*Primary Examiner*—Lee W. Young

[57] ABSTRACT

A mounting assembly (20) which includes dissimilar radial spring rates in the various radial directions by varying the socket geometry and dimensional characteristics of a receiving member (22) for accepting a standard round cross-section, center-bonded mounting (21). A reduction in spring rate in the range of between 1.25 and 2.5 times can be achieved by modifying the socket geometry to provide superior lateral vibration isolation, yet, a standard center-bonded mounting still can be utilized providing cost effective applications.

8 Claims, 2 Drawing Sheets

5,651,535

MOUNTING ASSEMBLY WITH DISSIMILAR RADIAL SPRING RATES

FIELD OF THE INVENTION

This invention relates to the area of mountings for resiliently mounting a vibrating member to a support member. More particularly, the present invention is directed to improved center-bonded bushing-type mountings.

BACKGROUND OF THE INVENTION

Bushing-type mountings are widely known in the art. One such mounting is described in the commonly assigned U.S. Pat. No. 3,895,408 to Leingang, the disclosure of which is hereby incorporated by reference herein. This type of mounting 10 is typically referred to as a "center-bonded mounting" and includes a rigid cylindrical sleeve 14 which is usually bonded to a round cross-section, concentric elastomer section. The elastomer section includes a body portion 11 and opposite end portions 12 and 13. End portions 12 and 13 generally determine the as-installed axial spring rate, while the body portion 11 generally determines the radial spring rate.

This type of mount, referred to as a "CB Series" center-bonded mount is manufactured by Lord Corporation of Erie, Pa. These mounts isolate vibration, absorb shock loads, and attenuate noise due to structureborne vibration. CB mounts are available in a number of standard sizes, and thus are highly cost effective. One of the keys to keeping the cost low is the round cross-section used in the CB mounting concept. This round cross-section leads to low mold costs because it simplifies the machining practices required to produce the molds for bonding these mounts.

The mounts are installed by first inserting the CB mounting through a circular receiving bore. Second, flat washers or the like are placed on the upper and lower sides of the mounting. The assembly is then precompressed by tightening the attachment bolt against the inner member. However, one of the drawbacks of prior mounting systems and assemblies using center-bonded mounts was the inability to exhibit differing radial spring rates, a requirement for some systems. Thus, for systems requiring differing spring rates, more complex mounting systems and bonded components were required. In other words, because of the round cross-section of the center-bonded mount required for low manufacturing cost and standardization, the center-bonded mounts were thought to be capable of only one common radial spring rate. U.S. Pat. No. 3,128,999 to Schmitt, which is commonly assigned, and U.S. Pat. No. 3,675,881 to Caldwell, describe other center-bonded mount embodiments and the disclosures of each is hereby incorporated by reference herein.

SUMMARY OF THE INVENTION

With the foregoing advantages and limitations of center-bonded mounts in mind, the present invention is directed to a low cost mounting assembly whereby dissimilar radial spring rates are obtained while retaining the use of a round cross-sectioned, center-bonded mount. This differential in spring rate is achieved by utilizing various socket concepts within the receiving member or outer member for accepting the center-bonded mount. The novel socket concepts of the receiving member will accommodate standard center-bonded mounts, yet provide differential radial spring rates in the various radial directions by a factor of 1.25:1 or more, a feature not present in prior mounting assemblies utilizing center-bonded mounts. Differentials spring rates as high as about 2.5:1 in the perpendicular radial directions are possible to achieve. It is another aspect of this invention that the novel socket concept includes a first dimensional characteristic and a larger second dimensional characteristic for providing the dissimilar radial spring rates through various levels of precompression or contact. It is a point of novelty of the present invention that the assembly provides dissimilar radial spring rates while still retaining the use of the low-cost, round cross-sectioned, concentrically-bonded standard center-bonded mount.

It is a feature of the present invention to provide a mounting assembly, comprising a standard center-bonded mounting and a receiving member having a socket formed therein for receiving said center-bonded mount, said socket including a first dimensional characteristic for defining a precompression of said center-bonded mounting along a first radial axis, a second dimensional characteristic for defining a precompression of said center-bonded mounting along a second radial axis; said first dimensional characteristic being smaller than said second dimensional characteristic and providing a first radial spring rate along said first radial axis that is greater than said second radial spring rate along said second radial axis.

It is an advantage of the present invention that the mounting assembly can supply different or differing radial spring rates in the lateral, and thrust directions, yet still allow the use of a standard low-cost, round cross-section, center-bonded mounting configuration. It is a further advantage of the present invention that the novel mounting assembly can supply differing radial spring rates in the various radial directions in very cost sensitive applications.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate key embodiments of the present invention. The drawings and description together, serve to fully explain the invention. In the drawings.

DETAILED DESCRIPTION OF THE INVENTION

Figure 1:
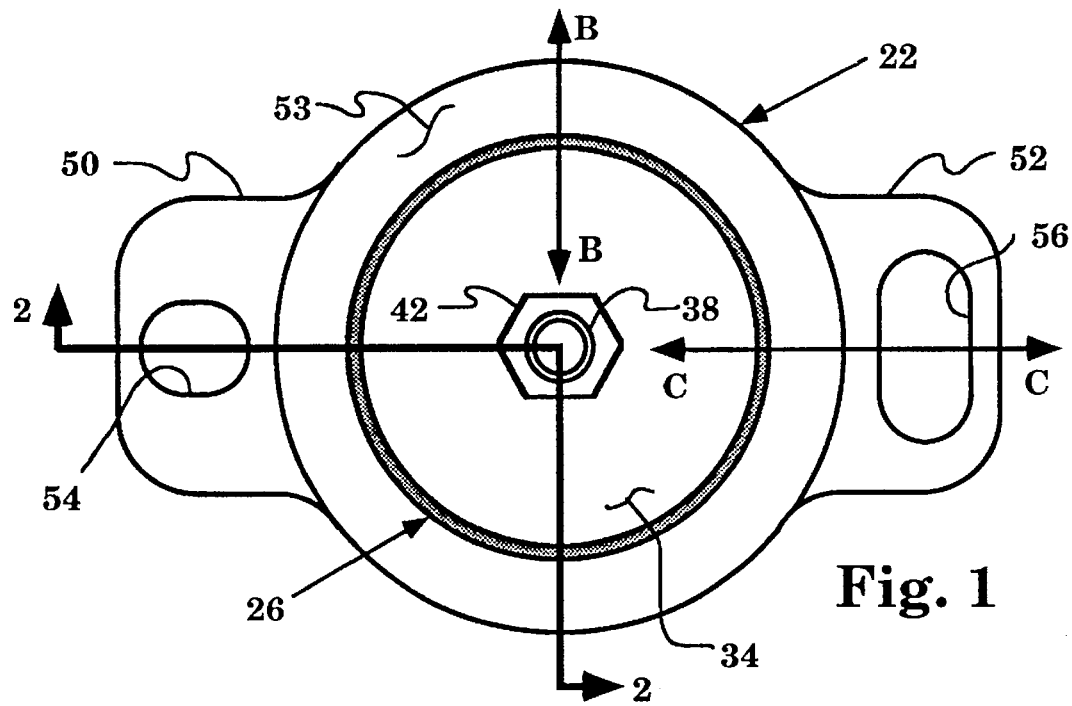
FIG. 1 is a top view of the mounting assembly.
Figure 2:
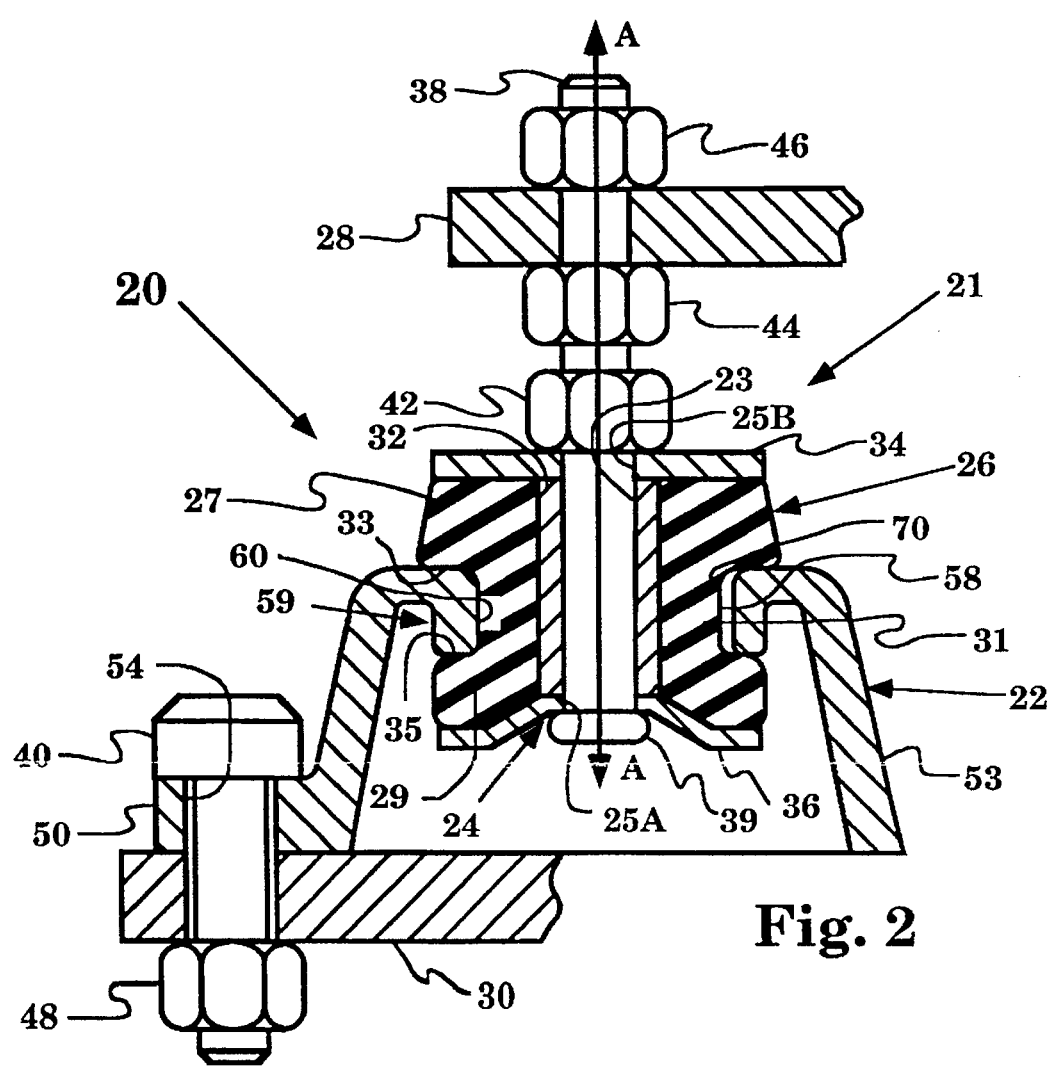
FIG. 2 is a cross-sectional side view of the mounting assembly with dissimilar radial spring rates shown in the as-installed condition with no load applied.

Turning now to the drawings, and referring to FIGS. 1 and 2, the mounting assembly of the present invention is indicated generally at 20 shown installed in a typical environment. The mounting assembly 20 of the present invention includes a standard center-bonded mount 21, an outer member 22 for receiving the standard center-bonded mount 21, and an multiple-piece inner member 24. The mounting assembly 20 flexibly interconnects a first member 28 such as a vibrating engine to a second member 30 such as a frame or support. Elastomer member 26 receives the multiple-piece inner member 24 which attaches to the first member 28 and is comprised of sleeve 32, first end member 34 such as washer shown, and second end member 36. The washers can be flat or have a shape such as second end member 36 and are preferably of stamped steel construction.

First bolt 38 which includes head 39 is inserted through hole 25A in second end member 36, through the bore 23 in sleeve 32, through the hole 25B in first end member 34 and then is secured by tightening nut 42. Tightening of nut 42 precompresses the first section 27 of elastomer member 26 against top surface 33 of outer member 22 and precompresses second elastomer section 29 against bottom surface 35 thereof. Third elastomer section 31 is intermediate to the first and second sections 27 and 29. Sections 27, 29, and 31 make up the elastomer member 26. Sections 27 and 29 substantially dictate the axial spring rate along axis A—A. Third elastomer section 31 substantially defines the radial spring rate along axes C—C and B—B.

The outer member 22 includes flanges 50 and 52 and wall portion 53 of frustoconical shape and is attached to second member 30 by way of a second bolt 40 extending through bore 54 in flange 50. A similar bolt (not shown) extends through elongated bore 56 to secure the other flange 52 to the second member 30. Preferably, the outer member 22 will be manufactured from cast aluminum or iron. Tightening fourth nut 48 secures outer member 22 rigidly to the second member 30 (only a portion of which is shown).

To connect the mounting assembly 20 to the first member 28, a series of second and third nuts 44 and 46 are used. Nut 44 is threaded upon first bolt 38 to the desired height, then first member 28 is inserted over first bolt 38 and a third nut 46 is torqued to fasten the first member 28 rigidly and securely to the first bolt 38 and, as a result, to the inner member 24.

The recessed portion 58 of elastomer portion 26 substantially defines the third elastomer section 31. Upon inserting center-bonded mount 21 into socket 59 for receiving it and securing nut 42 to the desired torque, it can be seen that the radial precompression is not evenly applied to all sections of the recessed portion 58, which is round in cross-section. As shown in FIG. 2, the radial spring rate characteristic along axis B—B is less stiff than that along axis C—C. The key to this difference is that when the standard center-bonded mount 21 is inserted in socket 59, the contact between the recessed portion 58 of the elastomer section 31 and the socket 59 is different along those axes due to the novel configuration of socket 59 (FIGS. 3A, 4A–F) used. It can be seen that under a zero static radial load condition (an unloaded condition), that recessed portion 58 of the third elastomer section 31 is in contact with the first diametrical arc 60, yet, rotationally 90 degrees therefrom about axis B—B, the fourth diametrical arc 70 is not in contact with the recessed portion 58 of elastomer member 26. This is the key to the present invention and the means by which the different radial spring rates are achieved in the radial directions along axis B—B and along axis C—C. This novel concept of the socket 59 varies the level of contact between the recessed portion 58 and the socket 59 that is dictated by the dimensional characteristics of the socket 59. This concept is further described with reference to FIG. 3A.

Figure 3A:
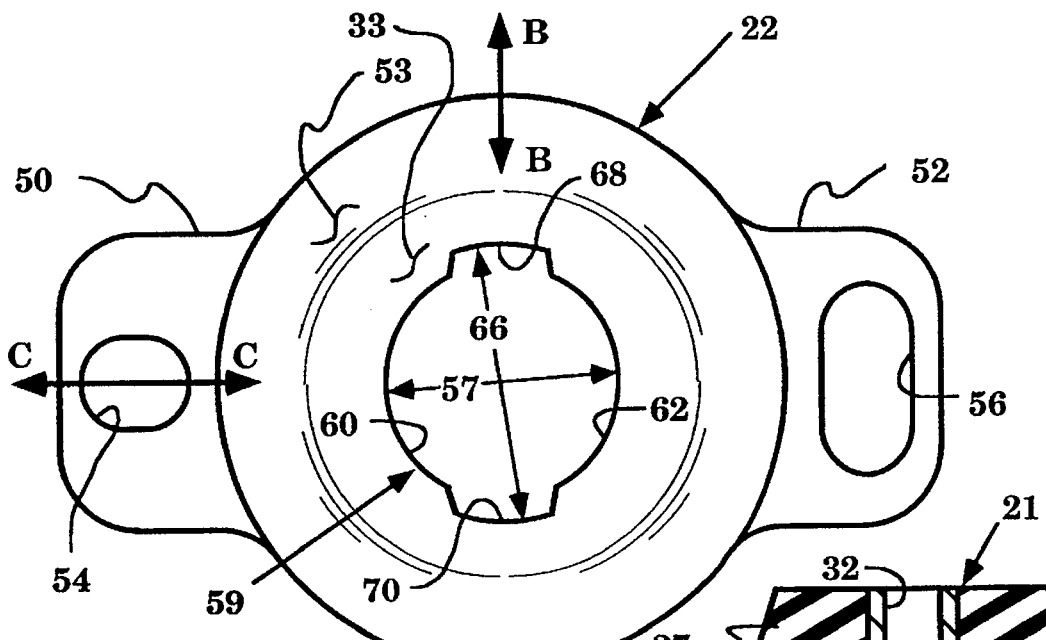
FIG. 3A is a top view of an outer member illustrating one novel socket concept.
Figure 3B:
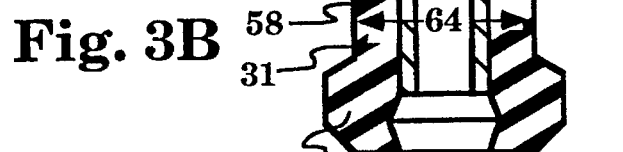
FIG. 3B is a cross-sectional side view of the center-bonded mount used in the present invention.
Figure 4A:
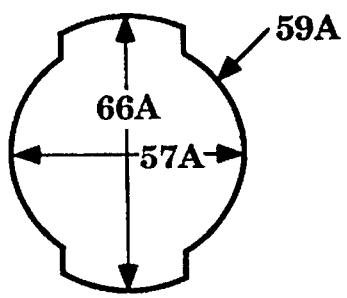
FIG. 4A–4F illustrates other possible novel socket embodiments.
Figure 4B:
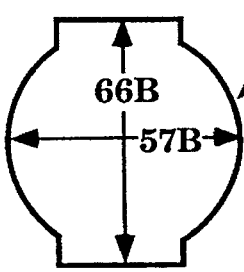
Figure 4C:
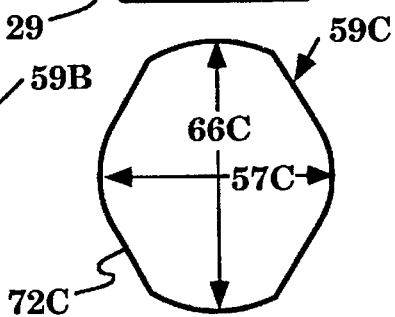
Figure 4D:
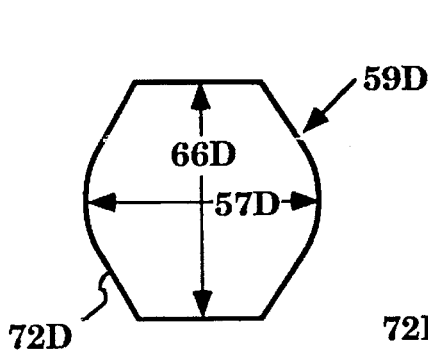
Figure 4E:
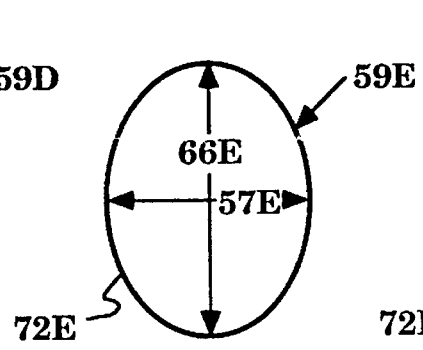
Figure 4F:
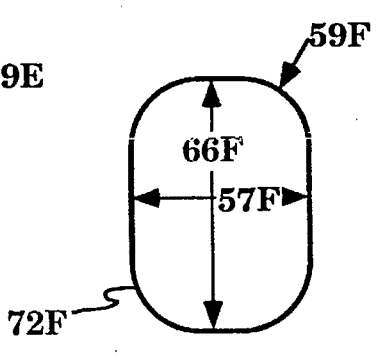

FIG. 3A illustrates one embodiment of socket concept for use with the standard center-bonded mount 21 (FIG. 1). The outer member 22 is comprised of flanges 50, 52 with bores 54 and 56 formed therethrough. Bore 54 and elongated bore 56 help in lining up the mounting assembly 20 (FIG. 1). The socket 59 includes a first dimensional characteristic 57 which in this embodiment is comprised of opposed surfaces such as diametrical arcs 60 and 62. The dimension of the first dimensional characteristics 57 is slightly smaller than the diameter 64 (FIG. 3B) of the standard center-bonded mount 21 (FIG. 3B). In this manner, the third elastomer section 31 (FIG. 3B) of center-bonded mount 21 (FIG. 3B) is placed under a slight amount of radial precompression along diametrical arcs 60 and 62 upon installation of the mount in the socket 59.

A second dimensional characteristic 66 is defined by a second pair of opposed surfaces such as diametrical arcs 68 and 70. This second dimensional characteristic 66 is wider or larger dimensionally than the first dimensional characteristic 57. Because of this, the recessed portion 58 of the third elastomer section 31 (FIG. 3B), when installed may not contact the socket 59 along the opposed surfaces such as diametrical arcs 68 and 70. However, the recessed portion 58 is in contact with, and precompressed between, the sleeve 32 and that portion of the socket 59 defined by diametrical arcs 60 and 62. This causes the mounting to be relatively stiff along axis C—C (the fore and aft, or thrust, direction). Contrarily, because the recessed portion 58 may not be in full contact with the socket 59, i.e., is not precompressed by socket 59, the mount is relatively soft along axis B—B (the lateral direction). There may be no contact, or just significantly less contact region, along the soft axis C—C. This variation in spring rate is important in that it is desired to provide responsiveness to the engine 28 in the thrust direction while isolating the lateral vibrations thereof from member 30.

FIG. 3B illustrates a standard center-bonded mount 21 for use with the present invention. Mount 21 includes a sleeve 32, a first elastomer section 27 which includes a flared head which contributes to the first portion of the axial spring rate, a second elastomer section 29 which also includes a flared head, and a third elastomer section 31 which is contained within and contacts portions of socket 59 (FIG. 3A) during use. The third elastomer section 31 includes a recessed portion 58 which is recessed to provide a diameter 64. Upon installation, the second elastomer section 29 is deformed by axial precompression to contribute the second axial portion of the axial spring rate. Together, the first and second sections 27 and 29 make up the majority of the axial spring rate. The third elastomer section 31 contributes the majority of the radial spring rate. The elastomer making up sections 27, 29, and 31 is bonded to inner member 32 by any of a number of conventional processes known to those of skill in the art.

Further, in another aspect, the particular configuration of the socket 59 is modified to provide increasing levels of precompression on the center-bonded mount 21 as more and more of the recessed portion 58 of the center-bonded mount comes into contact with the outer member 22 and becomes loaded under radial loading. The precompression in the soft direction can either be zero or simply lesser in amount than along the perpendicular axis (stiff direction) and still provide dissimilar radial spring rates. Also, by making the opposed surfaces flat, some bulge area is allowed, i.e., the contact area will increase as more load is applied.

In FIG. 4A through FIG. 4F are illustrated various other novel concepts for sockets 59A through 59F. Here like numerals denote like elements. These figures illustrate using arc sections defining dimensional characteristics 66A, 66C, 66E, and flat sections defining dimensional characteristics 66B, 66D, and 66F. Some sockets 59 are illustrated with either parallel or tapered sides adjacent and intersecting the second dimensional characteristic 66. Rectangular sockets 59F (FIG. 4F), and elliptical sockets 59E (FIG. 4E) are also illustrated. Each of these socket concepts will provide unequal radial spring rates along the B—B axis and the C—C axis of FIG. 3A. The tapered sides 72C, 72D, 72E, 72F can be formed either by curvatures as in 72E, or by straight tapers as in 72C and 72D, or by radii 72F. These tapered sides allow the outer member 22 (FIG. 3A) to gradually contact more of the recessed portion 58 of center-bonded mount 21 as more load is radially applied along axis B—B. This allows a spring rate that is softer upon first loading and which gradually stiffens as more radial load is applied. By way of example, the radial spring rate along axis C—C might be stiffer than along axis B—B by a ratio of 1.25:1 or more, with a ratio of 2.5:1 resulting from the softening of the spring rate along B—B having been demonstrated. Even higher ratios are thought to be achievable.

In summary, the present invention is a novel mounting assembly 20 which exhibits unequal radial spring rates and which utilizes standard center-bonded mounts 21. The unequal or dissimilar radial spring rate characteristics are achieved by utilizing a novel socket 59 in combination with a standard center-bonded mount 21, said novel socket 59 including a first dimensional characteristic along a first axis C—C which is less than a second dimensional characteristic along a second axis B—B. A variety of socket concepts 59A through 59F are described for accomplishing the differential radial spring rate characteristics. This variation in spring rate between the thrust and lateral direction affords rapid responsiveness for changes in engine thrust while providing good isolation from lateral engine vibrations.

While the preferred embodiment of the present invention has been described in detail, various modifications, alterations, changes and adaptations to the aforementioned may be made without departing from the spirit and scope of the present invention defined in the appended claims. For example, it is apparent that the combination of the socket concepts and the round cross section standard center-bonded mount can be used in any receiving member, such as a plate or panel, bracket or other like member as well as the described outer member. It is intended that all such modifications, alterations and changes be considered part of the present invention.

What is claimed is:

1. A mounting assembly, comprising:
   a) a center-bonded mounting including:
      i) an inner member sleeve having a central axis and inner and outer surface;
      ii) an elastomer member bonded to said outer surface of said sleeve which includes an annular recessed portion having a round cross-section defining a third elastomer section and dividing said elastomer member into a first elastomer section and a second elastomer section;
      iii) a first end member contacting said first elastomer section;
      iv) a second end member contacting said second elastomer section, said first elastomer section and said second elastomer section together substantially defining an axial spring rate;
   b) an outer member having means for attachment to a first member having a socket formed therein for receiving said third elastomer section of said center-bonded mounting, said socket including a first dimensional characteristic for defining a first precompression of said round cross-section of said third section of said elastomer member along a first radial axis and defining a thrust axis of said mounting assembly, a second dimensional characteristic for defining a second precompression of said round cross-section of said third elastomer section along a second radial axis defining a lateral axis of said mounting assembly; said first dimensional characteristic being smaller than said second dimensional characteristic for providing a first radial spring rate along said thrust axis that is greater than a second radial spring rate in said lateral direction by at least a factor of 1.25, and
   c) an inner member for precompressing said first end member axially against said first elastomer section and said second end member axially against said second elastomer section and for attachment to a first member.

2. A mounting assembly of claim 1 wherein said elastomer member is manufactured from a material selected from the group including natural rubber, synthetic rubber, and a natural and synthetic rubber blend.

3. A mounting assembly of claim 1 wherein said second radial spring rate is provided by said socket having a geometric characteristic including an arc section with two non-parallel sides connected to said arc section.

4. A mounting assembly of claim 1 wherein said second radial spring rate is provided by said socket having a geometric characteristic including an arc section with two parallel sides connecting to said arc section.

5. A mounting assembly of claim 1 wherein said second radial spring rate is provided by said socket having a geometric characteristic including a straight end section with two connected non-parallel sides.

6. A mounting assembly of claim 1 wherein said second radial spring rate is provided by said socket having a geometric characteristic including a straight end section with connecting parallel sides.

7. A mounting assembly of claim 1 wherein said second radial spring rate is provided by said socket having a geometric characteristic including an elliptically shaped section.

8. A mounting assembly of claim 1 wherein said second radial spring rate is provided by said socket having a geometric characteristic including a rectangular shaped section.

* * * * *